United States Patent [19]
Schnell

[11] Patent Number: 5,905,326
[45] Date of Patent: May 18, 1999

[54] PIEZOELECTRIC BUZZER CONTROL CIRCUIT

[75] Inventor: Klaus Schnell, Gau-Algesheim, Germany

[73] Assignee: Eaton Corporation, Cleveland, Ohio

[21] Appl. No.: 08/905,300

[22] Filed: Aug. 1, 1997

[51] Int. Cl.$^6$ .................................................. H01L 41/08
[52] U.S. Cl. ...................... 310/318; 340/384.6; 310/316
[58] Field of Search ................................... 310/316–319, 310/322, 324; 340/384.6

[56] References Cited

U.S. PATENT DOCUMENTS

| | | | |
|---|---|---|---|
| 4,303,908 | 12/1981 | Enemark et al. | 310/316 X |
| 4,393,373 | 7/1983 | Torii et al. | 310/316 X |
| 4,653,101 | 3/1987 | Myers | 310/316 X |
| 5,181,019 | 1/1993 | Gottlieb et al. | 310/316 X |

Primary Examiner—Mark O. Budd
Attorney, Agent, or Firm—Roger A. Johnston

[57] ABSTRACT

A control circuit for a piezoelectric buzzer, notably for automobiles, comprises a circuit for generating alternately two different frequencies and features two input supply terminals (1, 2) and two output terminals (4, 5) for buzzer activation. The control circuit includes a first flip-flop with a first and a second output, of which one carries positive and the other negative voltage. Also provided is a second flip-flop with a first input and an output, the first input connecting to the first and second outputs of the first flip-flop, each via a resistor (R4, R3). The second flip-flop consists of a parallel wiring of a first series connection of a capacitor (C2) and an inverter with Schmitt trigger input (IC1C), and a second series connection of a resistor (R5) and an inverter with Schmitt trigger input (IC1D), while a resistor is wired in parallel with the second series connection. Once a positive supply voltage is applied and grounding established, the buzzer sounds, generating alternately different frequencies f1 and f2.

6 Claims, 3 Drawing Sheets

PIEZOELECTRIC BUZZER CONTROL CIRCUIT

BACKGROUND OF THE INVENTION

The invention relates to a control circuit for a piezoelectric buzzer, notably for automobiles, comprising a circuit for generating alternately two different frequencies, comprising two supply input terminals and two output terminals for buzzer activation.

It happens again and again that the lights are not being turned off and safety devices not turned on and/or locked. To bring the omission to the user's attention, buzzers are used, notably in the automotive field. Such buzzers are preferably equipped to produce two sounds of different pitch, so as to attract the user's attention with certainty.

BRIEF SUMMARY OF THE INVENTION

The objective underlying the invention is to create a control circuit for a piezoelectric buzzer of very reliable operation.

This objective is satisfied according to the invention with a control circuit for a piezoelectric buzzer with the features of claim 1. Improvements of the inventional control circuit are the object of the subclaims.

The inventional control circuit for a piezoelectric buzzer, notably for automobiles, features a circuit for generating alternately two different frequencies, said circuit comprising two supply input terminals and two output terminals for buzzer activation. The circuit includes a first flip-flop with a first and a second output, of which one carries positive voltage while the other connects to ground. Additionally provided is a second flip-flop with a first input and an output; the first input is connected to the first and second outputs of the first flip-flop, via a resistor for each. The second flip-flop consists of wiring in parallel a first series connection of a capacitor and an inverter with Schmitt trigger input, and of a second series connection of a resistor and an inverter with Schmitt trigger input, while with the second series connection a resistor is wired in parallel.

Once a positive supply voltage and ground are connected, the buzzer sounds, alternately generating different frequencies f1 and f2.

The second flip-flop outputs a rectangular signal with a frequency f1 when positive voltage prevails on the first output of the first flip-flop and the second output of the first flip-flop carries negative voltage. With the first output of the first flip-flop carrying negative voltage and its second output positive voltage, a rectangular signal with a frequency f2 is generated. The time duration t1 of the frequency f1 matches about the time duration of the frequency f2. The sum of durations t1 and t2 is t3. The reciprocal of t3 returns f3. The time pattern of the frequencies is illustrated in FIG. 1. The times t1 and t2 are approximately equal in the illustrated example, i.e., each being about t3/2. The frequency f1 is lower than the frequency f2 (f1<f2), and the frequency f3 is very low in relation to the two frequencies f1 and f2 (f3<<f1, f2).

The first flip-flop consists preferably of a parallel wiring of a series connection of a first inverter with Schmitt trigger input, a capacitor and a resistor, the outputs of which connect to a second inverter with Schmitt trigger input. The output of the first inverter with Schmitt trigger input and the output of the second inverter with Schmitt trigger input are the first and second outputs of the first flip-flop. This produces on the two outputs of the first flip-flop two rectangular signals that are in phase opposition and have a frequency f3.

In a preferred embodiment of the control circuit for a piezoelectric buzzer, a final stage is provided that separates the buzzer from its control circuit. The final stage includes suitably a series connection of two inverters with Schmitt trigger input, whose outputs are the two output terminals for buzzer activation. A rectangular signal in phase opposition is then available on the two output terminals.

The inventional control circuit includes a control input for buzzer shutoff, to which input connects a resistor, to the output of which connect the inputs of two diodes. The outputs of the diodes are connected to the input of the first inverter with Schmitt trigger input and to the input of the inverter with Schmitt trigger input of the second series connection of the second flip-flop. Sustained application of a positive voltage stops the two astable flip-flops, and the buzzer is no longer activated with a rectangular signal. In this way, the buzzer is turned off despite carrying supply voltage, and a buzz is no longer generated.

The voltage supply of the inventional control circuit, respectively of the buzzer, may comprise a voltage supply with a first terminal for positive supply voltage and a second terminal for ground, said voltage supply consisting of a resistor, a zener diode, two capacitors and a diode. Such a voltage supply is typically used in the automotive field. It provides sufficient protection against overvoltage, disturbance signals and inversion of polarity. The supply voltage thus generated serves as supply for the remainder of the circuit.

The invention is described further hereafter with the aid of a preferred exemplary embodiment and the drawing. The invention is not limited to this embodiment, which is shown for illustration, and is not limited either to the combinations set forth in the subclaims.

DETAILED DESCRIPTION OF THE INVENTION

The following describes an exemplary embodiment of the inventional piezoelectric buzzer control circuit.

Figure 1:
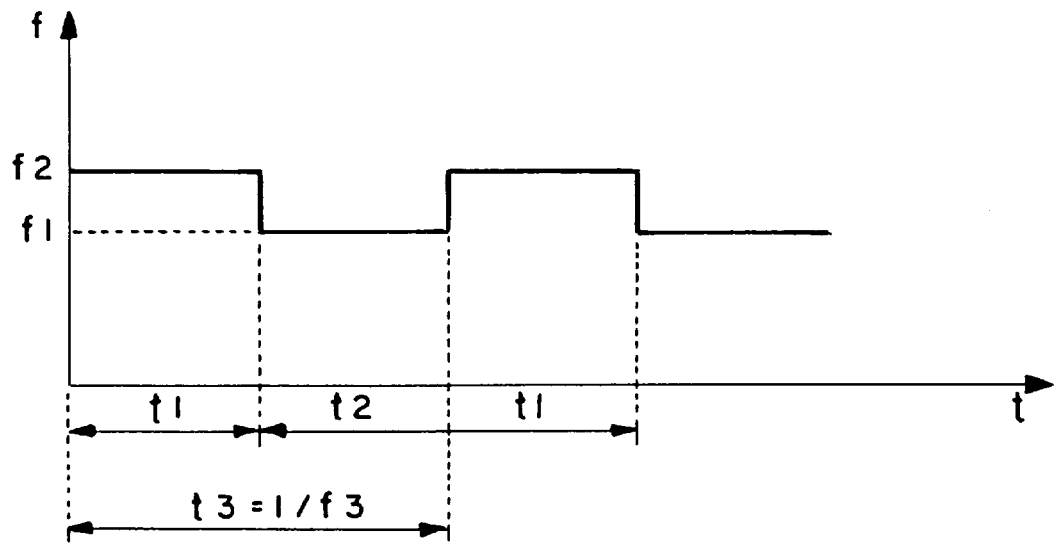
FIG. 1, a diagram illustrating the time pattern of frequencies f1 and f2 of the buzzer.
Figure 2:
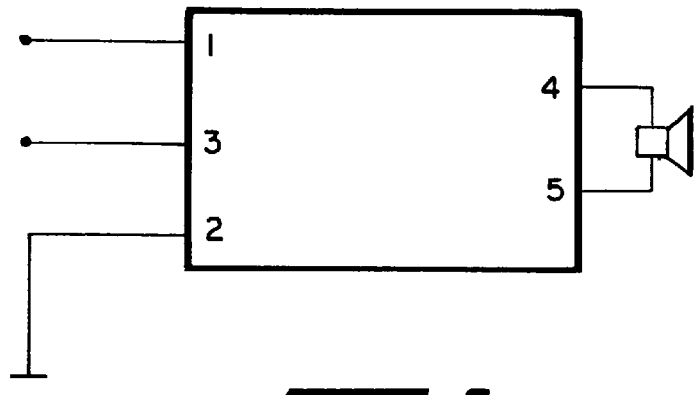
FIG. 2, a block wiring diagram of the buzzer control circuit.

As illustrated in the block wiring diagram of FIG. 2, the control circuit comprises a terminal 1 for the positive supply voltage Ub, a terminal 2 for ground, a control input 3 for shutting the buzzer off, and two outputs 4, 5 for piezoelectric buzzer activation.

Figure 3:
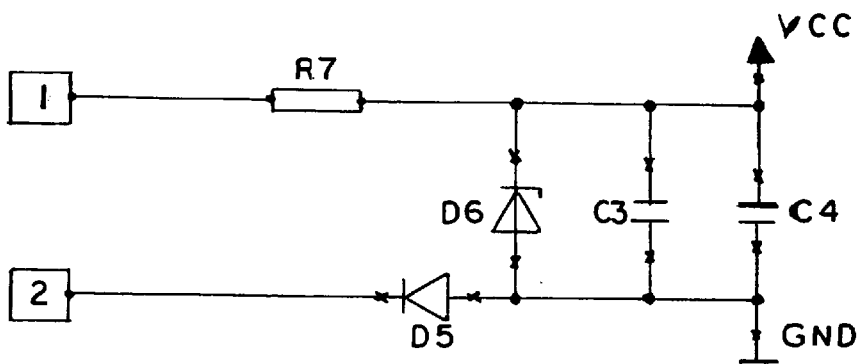
FIG. 3, an electric wiring diagram of a typical voltage supply used for a buzzer according to the invention.

Referring to FIGS. 2 and 3 a typical voltage supply +V is provided, such as used in the automotive field. It comprises two terminals 1 and 2. Terminal 1 serves to supply positive voltage of about 9 to 16 V, while the second terminal 2 is provided for ground. Terminal 2 connects via a diode D5 to ground (GND). A resistor R7 is connected to terminal 1. A zener diode D6 and two capacitors C3 and C4 are wired in parallel between the output and ground. The supply voltage VCC thus generated (based on GND) serves to supply the remainder of the circuit.

Figure 4:
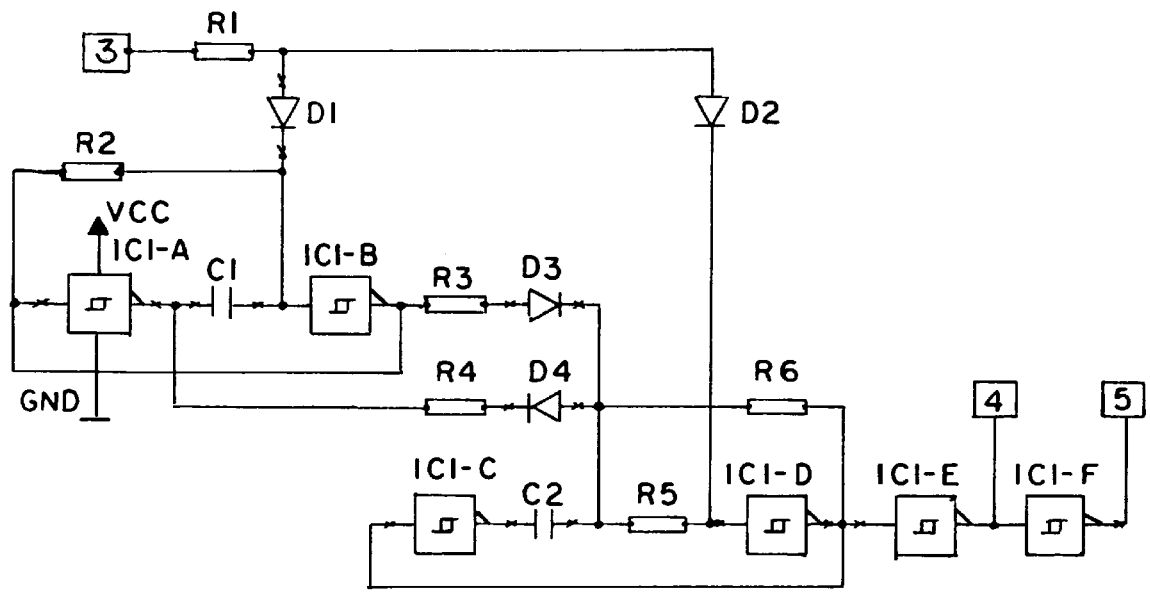
FIG. 4, an electric wiring diagram of an exemplary embodiment of the control circuit.

Referring to FIG. 4, the control circuit according to the invention consists substantially of a first and a second flip-flop. The first flip-flop generates the frequency f3 that serves the switching between the frequencies f1 and f2. A first and a second inverter with Schmitt trigger, IC1-A, IC1-B, a resistor R2 and a capacitor C1 form an astable flip-flop. The frequency f3 of this astable flip-flop is determined by the capacitor C1 and the resistor R2 and amounts to $$f3=1/(2,2\times C1\times R2)$$

Two rectangular wave signals in phase opposition and of frequency f3 occur on the outputs of the two inverters IC1-A and IC-B.

The second flip-flop generates either the frequency f1 or the frequency f2, depending on the switching state of the first flip-flop. The time relations and durations with f1 and f2 have already been explained. The second flip-flop includes a third and a fourth inverter with Schmitt trigger output IC1-C, IC1-D, two resistors R5, R6 and a capacitor C2. The output of the fourth inverter IC1-D connects to the input of the first inverter. Moreover, the second flip-flop comprises two series connections R3, D3 and R4, D4 connecting to the outputs of the first and second inverters IC1-A, IC1-B and connected between the third and fourth inverters IC1-C, IC1-D.

With the output of the first inverter IC1-A carrying positive voltage, and negative voltage prevailing on the output of the second inverter IC1-B, the second flip-flop, being in astable state, generates the lower frequency f1. The frequency is determined substantially by the capacitor C2 and resistor R6 and amounts to $$f1=1/(2,2\times C2\times R6)$$

A rectangular wave signal with the frequency f1 prevails on the output of the fourth inverter IC1-D.

Figure 5:
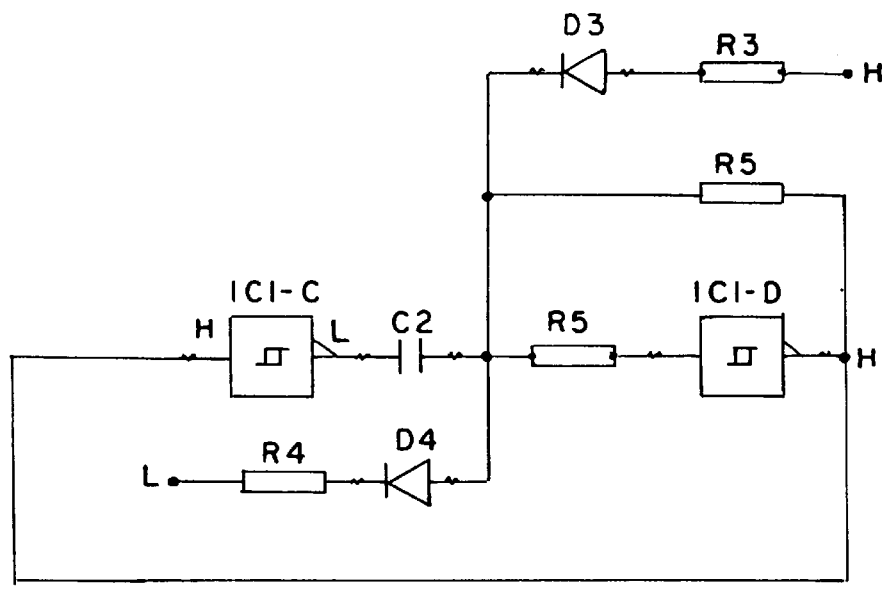
FIGS. 5 and 6, two equivalent circuit diagrams for the second flip-flop.
Figure 6:
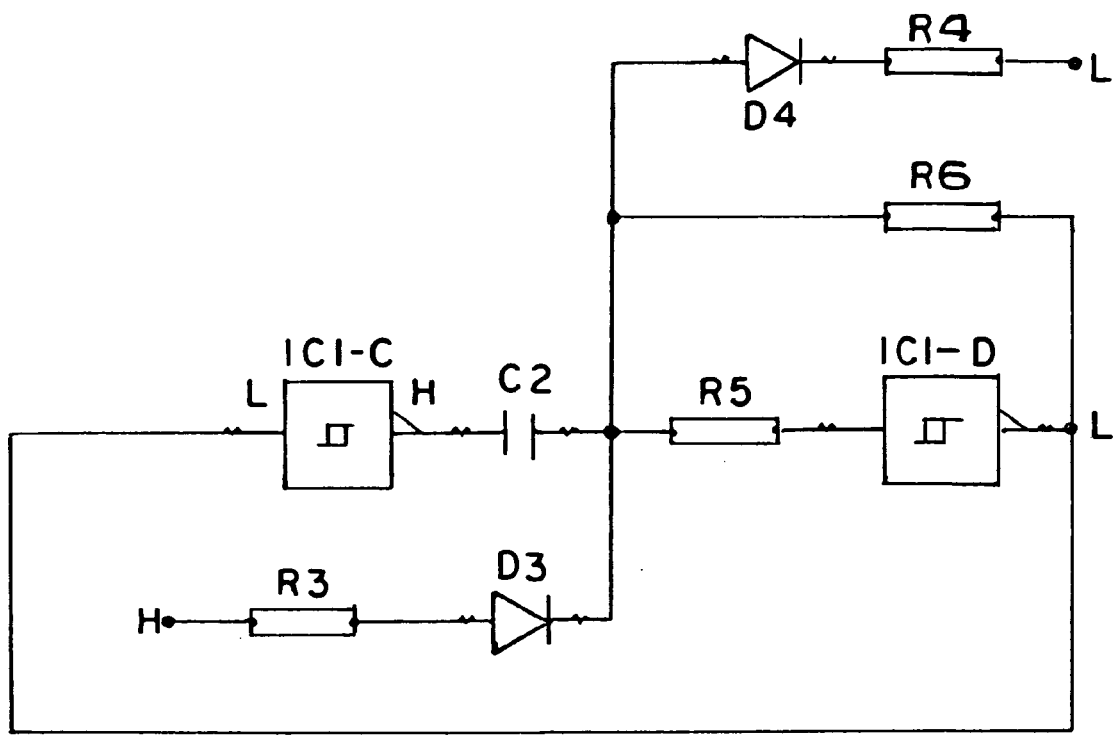

Referring to FIG. 5 and, with negative voltage prevailing on the output of the first inverter IC1-A and positive voltage on the output of the second inverter IC1-B, the equivalent circuits according to FIGS. 5 and 6 result for the second flip-flop. If the voltage drop on diodes D3, D4 is neglected, the frequency-determining resistance depends on the parallel wiring of R3 and R6 respectively R4 and R6. With R3 equaling R4, a frequency of the rectangular signal of $$f2 \approx 1 / \left(2, 2 \times C2 \times \frac{R3-R6}{R3+R6}\right)$$
$$\approx 1 / \left(2, 2 \times C2 \times \frac{R4 \pm R6}{R4+R6}\right)$$

occurs on the output of the fourth inverter IC1-D. Thus, f2 is greater than f1.

Referring to FIG. 4, the final stage of the control circuit illustrated here, consists of a fifth and sixth inverter with Schmitt trigger outputs IC1-E, IC1-F, by means of which the control circuit and the buzzer are decoupled. Their outputs form at the same time the output terminals 4 and 5 illustrated in FIG. 2 and provide there a rectangular signal in phase opposition.

In order to allow shutting the buzzer off, the control circuit includes additionally a control input, which in FIG. 2 and FIG. 4 is illustrated as terminal 3. Referring to FIG. 4, a resistor R1 and two diodes D1, D2 are connected to the control input 3. With a sustained voltage of 9 to 12 volts prevailing on input 3, the first and second flip-flops are stopped, and a rectangular signal is no longer emitted to the buzzer. Hence, the buzzer no longer sounds.

I claim:

1. Control circuit for a piezoelectric buzzer, notably for automobiles, comprising a circuit for generating two different frequencies alternately, comprising two input supply terminals (1, 2) and two output terminals (4, 5) for buzzer activation, characterized in that a first flip-flop with a first and a second output is provided, of which outputs one carries positive voltage and the other connects to ground;

a second flip-flop with a first input and an output is provided, the first input connecting to the first and second outputs of the first flip-flop, each via a resistor (R4, R3); and the second flip-flop consists of a parallel wiring of a first series connection of a capacitor (C2) and an inverter with Schmitt trigger input (IC1-C) and a second series connection of a resistor (R5) and an inverter with Schmitt trigger input (IC1-D), and a resistor (R6) is wired in parallel with the second series connection.

2. Control circuit for a piezoelectric buzzer according to claim 1, characterized in that the first flip-flop consists of a parallel wiring of a series connection of a first inverter with Schmitt trigger input (IC1-A) and a capacitor (C1) as well as a resistor (R2), the output of which flip-flop connects to a second inverter with Schmitt trigger input (IC1-B); and the output of the first inverter with Schmitt trigger input (IC1-A) and the output of the second inverter with Schmitt trigger input (IC1-B) are the first and the second outputs of the first flip-flop.

3. Control circuit for a piezoelectric buzzer according to claim 1, characterized in that a final stage is provided that separates the buzzer from the control circuit.

4. Control circuit for a piezoelectric buzzer according to claim 3, characterized in that the final stage comprises a series connection of two inverters with Schmitt trigger input (IC1-E, IC1-F), whose outputs are the two control terminals for buzzer activation.

5. Control circuit for a piezoelectric buzzer according to claim 1, characterized in that a control input (3) is provided to which connects a resistor (R1), with the output thereof connected to the inputs of two diodes (D1, D2) with the output of the first inverter with Schmitt trigger input (IC1–A) and the input of the inverter with Schmitt trigger input (IC1–D) of the second series connection of the second flip-flop.

6. Control circuit for a piezoelectric buzzer according to claim 1, characterized in that a voltage supply with a first terminal for positive supply voltage and a second terminal for ground is provided, consisting of a resistor (R7), a zener diode (D6), two capacitors (C3, C4) and a diode (D5).

* * * * *